Jan. 9, 1968   G. W. CURREY ET AL   3,363,242
EYELID ACTUATED SLEEP WARNING SYSTEM
Filed April 7, 1965   3 Sheets-Sheet 1
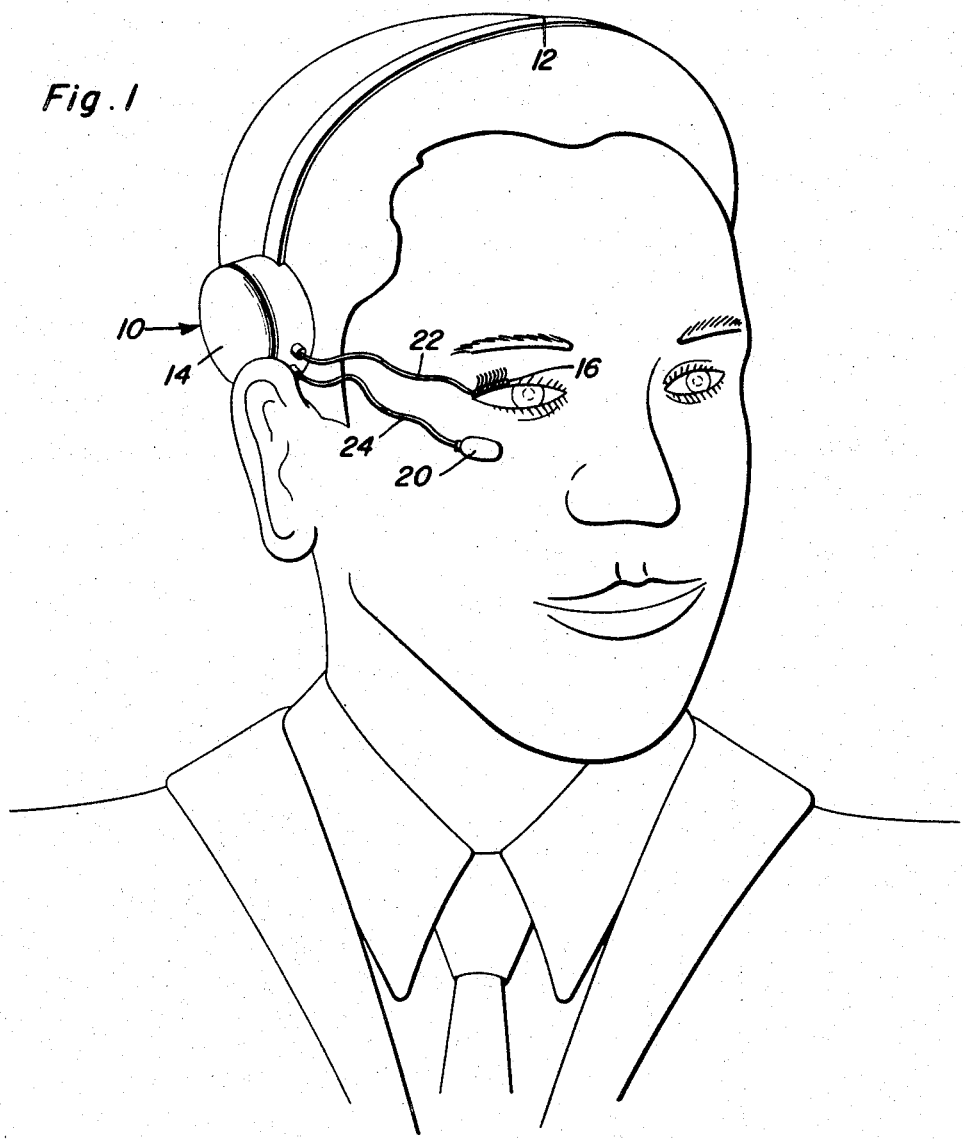
Fig. I
Fig. II
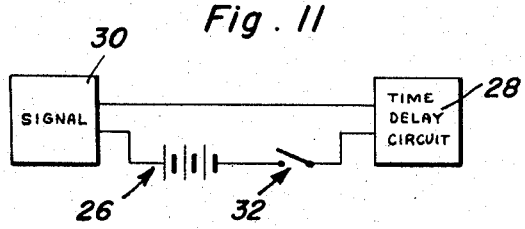
George W. Currey
Aaron L. Welsh
INVENTORS Jan. 9, 1968  G. W. CURREY ET AL  3,363,242
EYELID ACTUATED SLEEP WARNING SYSTEM
Filed April 7, 1965  3 Sheets-Sheet 2

George W. Currey
Aaron L. Welsh
INVENTORS

BY *[signatures]*
Attorneys

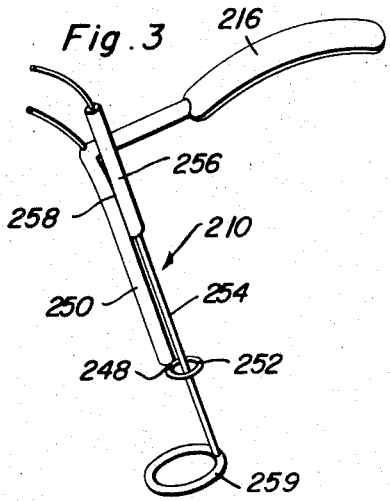
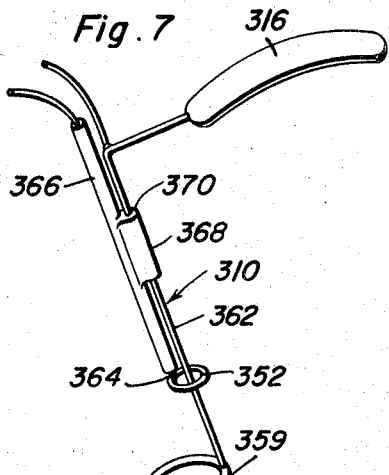
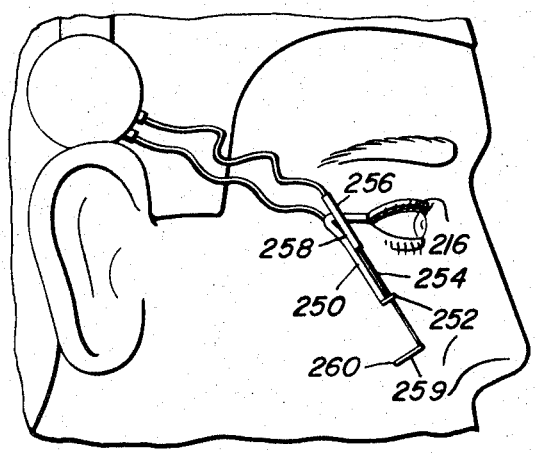
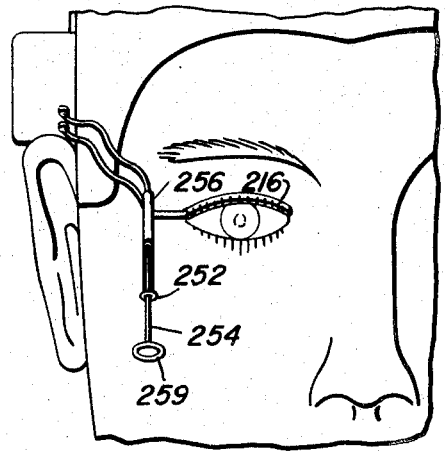
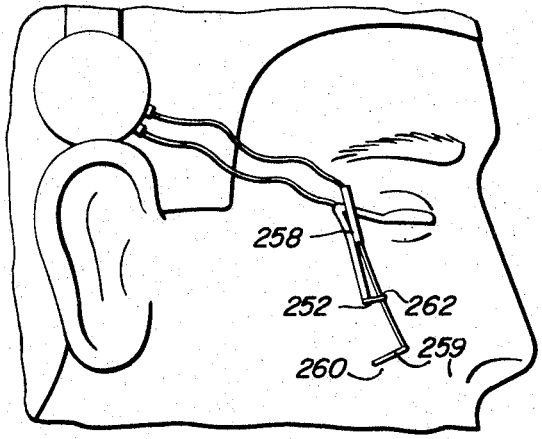
George W. Currey
Aaron L. Welsh
INVENTORS United States Patent Office 3,363,242
Patented Jan. 9, 1968

3,363,242
EYELID ACTUATED SLEEP WARNING
SYSTEM
George W. Currey, 613 Herring Drive, Macon, Ga.
31204, and Aaron L. Welsh, 116 Smith Place, Warner
Robins, Ga. 31093
Filed Apr. 7, 1965, Ser. No. 446,171
9 Claims. (Cl. 340—279)

ABSTRACT OF THE DISCLOSURE

An eyelid attachment adapted to be removably secured to the eyelid of a wearer and including terminal means supported therefrom in position for electrical contact with second terminal means supported from an adjacent cheek portion of the wearer upon the eyelid of the wearer closing, the terminal means being disposed in an electric circuit for an electrically actuatable alarm and which includes time delay means operative to delay actuation of the signal until the electrical circuit has been closed across the terminals for a predetermined minimum time.

---

This invention relates to devices for warning those in need of staying awake of impending sleep and more particularly to devices for warning of impending sleep which are activated by the wearer's eyelids.

Our new and modern highways and expressways are designed for speed, safety and comfort. The comfort afforded by these highways and by modern motor vehicles has increased the safety hazard of dozing or falling asleep at the wheel.

Therefore, a principal object of this invention is to provide a simple and practical sleep warning device that can be easily and quickly attached to the person, as for example the driver of a motor vehicle, or the like.

A further object of this invention is to provide a sleep warning device that can be mounted on a person and which is activated by the closing of that person's eyelids, a positive indication of impending sleep.

It is a further object of this invention to provide a sleep warning device including a time delay circuit for actuating an alarm signal to awaken the wearer of the sleep warning device.

It is another object of this invention to provide a sleep warning device that is lightweight, that needs no critical adjustment, that has few moving parts, that is relatively inexpensive, and that can be worn without discomfort to the wearer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating one form of the device being utilized by a wearer;

FIGURE 3 is a perspective view of a modified form of the invention;

FIGURE 4 is a side elevational view of the device of FIGURE 3 in place on a person;

FIGURE 5 is a front elevational view of the embodiment illustrated in FIGURE 3;

FIGURE 6 is a side elevational view of the device of FIGURE 3 in a second operative position;

FIGURE 7 is a perspective view of a modified form of the device illustrated in FIGURE 3;

FIGURE 11 is a schematic diagram illustrating the circuitry used in the present invention.

Figure 2:
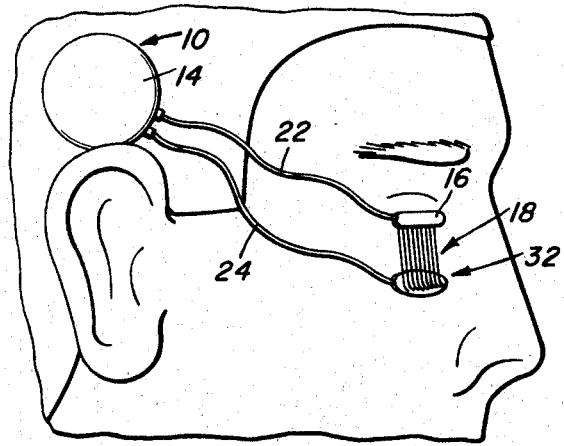
FIGURE 2 is an elevational view illustrating the device of FIGURE 1 in a second position.

Referring now more particularly to the drawings, numeral 10 refers generally to the sleep warning alarm device of the present invention. FIGURES 1 and 2 illustrate the first form of the invention, which includes a headband 12 that is mounted on the head in a well known manner, and a housing 14 supported by headband 12 which contains the electrical circuitry associated with the present invention. An eyelid attachment 16 is attached to the eyelid below the upper eyebrow by an adhesive (not shown) placed on the back of attachment 16. A plurality of fine flexible wires 18 are embedded in or otherwise secured to eyelid attachment 16 and are made of any well known conductive material. The wires 18 are preferably approximately .001 inch in diameter. A flat conductive patch 20 is secured to the wearer's cheek below the eye by means of an adhesive (not shown) placed on the back of the patch. Electrical leads 22, 24 extend respectively from eyelid attachment 16 and conductive patch 20 to the housing 14. The electrical circuit components contained within housing 14 consist of a D.C. battery or batteries 26, a time delay relay circuit 28 and a conventional signal or alarm 30. These components are wired as illustrated in FIGURE 11, in a manner well known to those skilled in the art.

The time delay relay circuit 28 is preferably preset to generate a signal after a time delay of approximately one-fourth second after being energized. It is readily apparent that wires 18 and conductive patch 20 constitute a switch 32, illustrated in FIGURE 2, which is closed only when the wearer's eye is closed. Thus, the circuit of FIGURE 11 is normally open, allowing current to flow to the alarm 30 only when the eye is closed over one-fourth second. This will preclude normal blinking of the eyes, in which case the eyelid is closed between one-twenty-fifth and one-tenth of a second, from activating the alarm 30.

Figure 8:
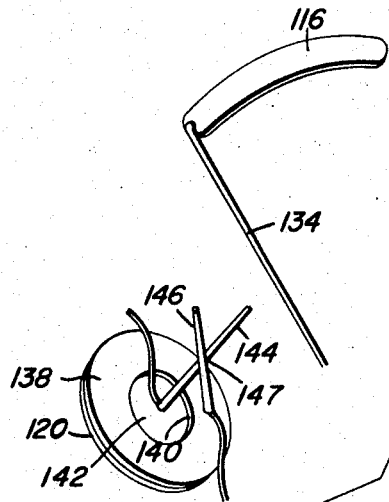
FIGURE 8 is a perspective view illustrating a still further modified form of the present device.
Figure 9:
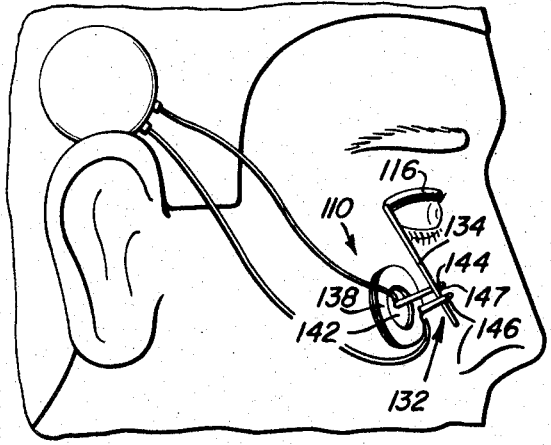
FIGURE 9 is a side elevational view of the device illustrated in FIGURE 8 in place on a person.
Figure 10:
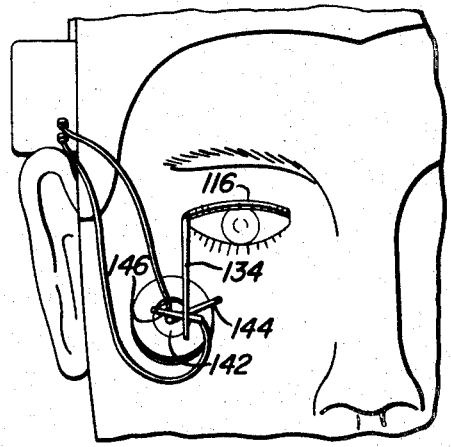
FIGURE 10 is a front elevational view of the device illustrated in FIGURE 8 in place on a person.

FIGURES 8, 9 and 10 illustrate a second preferred form of the present invention generally designated by the reference numeral 110. Eye attachment 116 has only a single conductive wire 134 mounted thereon. The conductive patch 20 is replaced by a first annular disk 120 which has adhesive on the back so as to be mounted on the wearer's face. Disk 120 is similar to a second annular disk 138, which lies over disk 130, both disks 120 and 138 having a center opening 140 therein, the opening preferably approximately one-half inch in diameter. Between disks 120 and 138 is placed a center disk 142 which is separated from disks 120, 138 by plastic insulators (not illustrated). Disks 120, 138 are formed from a conductive metal, and are preferably approximately .004 inch in thickness. The center disk 142 has mounted thereon a first conductive rod 144 and disk 138 has mounted thereon a second conductive rod 146. Rods 144 and 146 are skewed with relation to each other creating point 147 at which both may be contacted at the same time by the conductive wire 134. As is readily apparent in viewing FIGURES 8 through 10, when the wearer closes the eye with eyelid attachment 116 attached thereto, the conductive wire 134 will contact both rods 144 and 146 at point 147 thereby constituting a switch 132 as described above for operation in conjunction with a time delay relay circuit similar to circuit 28.

Referring now to FIGURE 3 for a description of a further modified form of the present invention generally referred to by the reference numeral 210, the reference numeral 216 refers to an eyelid attachment similar to the eyelid attachments illustrated in FIGURES 8 and 2. Extending from the eyelid attachment 216 and supported wholly by eyelid attachment 216 is a flexible conductive wire 248 covered by insulation 250. This wire is preferably spring steel from .006 to .008 in diameter and as may be appreciated is extremely lightweight. Wire 248 terminates in an uninsulated contact ring 252. Another flexible conductive wire 254 is covered by an insulating sleeve 256 fixedly attached by conventional means as at 258 to insulation 250. Flexible conductive wire 254 is preferably of spring steel and from .004 to .006 inch in diameter and is also extremely lightweight. Flexible conductive wire 254 terminates in an insulated trigger portion 259 which is normally spaced away from the face of the wearer when the eye is open. However, when the eye is closed, the trigger portion 259 contacts the wearer's face as at 260 and is biased into engagement with contact ring 252 as illustrated in FIGURE 6 at 262. The circuit of FIGURE 11 is thereby closed, and the device is actuated as explained above.

Referring now to FIGURE 7, there is disclosed a still further modification of the invention generally designated by the reference numeral 310. A conductive wire 362 is attached to an eyelid attachment 316 corresponding to attachments 16, 116 and 216, the flexible conductive wire 362 terminating in a trigger portion 359. Another flexible conductive wire 364 has an insulating sleeve 366 mounted thereon and the sleeve 366 has a shoulder portion 368 extending laterally therefrom. Flexible wire 364 is mounted on flexible wire 362 through the sleeve 366 by means of a longitudinal hole 370 through the shoulder 368. The flexible wire 364 terminates in an uninsulated contact ring 352 identical in construction to ring 252 of FIGURE 3 which surrounds flexible wire 362. It may be seen that the shoulder 368 may be adjusted in position along the length of flexible wire 362, thereby moving flexible wire 364 and contact ring 352 along therewith. The operation of the modified device illustrated in FIGURE 7 is similar to that of the device illustrated in FIGURE 3.

It is readily apparent from the foregoing that the sleep warning alarm device comprising the present invention operates as a switch in the alarm circuit illustrated in FIGURE 1. The time delay relay circuit 28 allows for normal blinking of the eye, which takes from one-tenth to one-twenty-fifth second, without sounding the alarm 30. It is only when a user of the device keeps his eyes closed for longer than one-quarter second, or for any predetermined length of time, that the alarm will be sounded.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a sleep warning alarm device, an eyelid attachment including means for adhesive securement to the eyelid of a wearer, normally open signal circuit means including an electrically operated signal, circuit closing means mounted on said eyelid attachment, contact means adapted to be adhesively secured to the face of the wearer and including means operatively connected to said circuit closing means and said contact means and responsive to closing said eyelid to close said circuit means and activate said signal, said circuit means further including time delay means operative to delay actuation of said signal until after said circuit closing means has been closed longer than the preset time delay of said time delay means, said circuit closing means comprising a plurality of fine flexible wires and said contact means comprises a flat conductive patch.

2. In a sleep warning alarm device, an eyelid attachment including means for adhesive securement to the eyelid of a wearer, normally open signal circuit means including an electrically operated signal, circuit closing means mounted on said eyelid attachment, contact means adapted to be adhesively secured to the face of the wearer and including means operatively connected to said circuit closing means and said contact means and responsive to closing said eyelid to close said circuit means and activate said signal, said circuit means further including time delay means operative to delay actuation of said signal until after said circuit closing means has been closed longer than the preset time delay of said time delay means, said circuit closing means comprising a single conductive wire and said contact means comprises a first annular disk adapted to be adhesively connected against the face of the wearer, a center disk fixed against the first disk and insulated therefrom, a second annular disk placed against said center disk and insulated therefrom, a first rod attached to said center disk, and a second rod attached to said second annular disk in skewed relationship to said first rod whereby said flexible wire can contact both said first and second rods at the same time.

3. The device of claim 2 wherein said center disk is adjustable between said first and second annular disk whereby said first rod can be adjusted in relationship to said second rod.

4. In a sleep warning alarm device, an eyelid attachment adapted to be adhesively secured to the eyelid of the wearer, normally open signal circuit means including an electrically operated signal, circuit closing means mounted on said eye attachment and including means operatively connected to said circuit, said circuit closing means including a first flexible conductive wire attached at one end directly to said eyelid attachment, and a second flexible conductive wire insulatingly attached at one end to said first conductive wire adjacent said eyelid attachment, the other ends of said wires being disposed in closely adjacent relation and disposed for engagement with each other upon contact of said first wire with the wearer's face upon the latter closing said eyelid thereby closing said circuit means and activating said signal.

5. The device of claim 4 wherein said circuit means further includes time delay means operative to delay actuation of said signal until said circuit closing means has been closed longer than the preset time delay of said time delay means.

6. The device of claim 5 wherein said first flexible wire includes a contact ring at said other end thereof, said second flexible wire extending through said contact ring and including an insulated trigger portion at the other end placed for engagement with the wearer's face upon closing the eye.

7. In a sleep warning alarm device, an eyelid attachment adapted to be adhesively secured on the eyelid of a wearer, normally open circuit means including an electrically operated signal, circuit closing means mounted on said eyelid attachment and including a first flexible conductive wire attached at one end connected to said eyelid attachment, a second flexible conductive wire having one end thereof mounted within an insulating sleeve, said sleeve including a shoulder adjustably mounting said sleeve on said first flexible conductive wire, the other ends of said wires being disposed in closely adjacent relation and disposed for engagement with each other upon contact of said first wire with the wearer's face upon the latter closing said eyelid thereby closing said circuit means activating said signal.

8. The device of claim 7 wherein said circuit means further includes time delay means operative to delay actuation of said signal means until said circuit closing means has been closed longer than the preset time delay of said time delay means.

9. The device of claim 8 wherein said second flexible wire includes a contact ring on said other end thereof, the other end portion of said first flexible wire extending through said contact ring in spaced relation thereto and including an insulated trigger portion at the terminal end thereof placed for engagement with the wearer's face upon closing the eye.

References Cited

UNITED STATES PATENTS 2,210,330  8/1940  Niggl et al. _____ 340—279

FOREIGN PATENTS 899,917  12/1953  Germany.

THOMAS B. HABECKER, *Acting Primary Examiner.*

NEIL C. READ, D. L. TRAFTON, *Examiners.*